June 16, 1953 F. C. WILLIAMS 2,642,550

ELECTRONIC INFORMATION STORAGE DEVICE

Filed Jan. 11, 1951 2 Sheets-Sheet 1

INVENTOR:
FREDERIC CALLAND WILLIAMS
ATTORNEYS:
Moore and Hall.

June 16, 1953 F. C. WILLIAMS 2,642,550

ELECTRONIC INFORMATION STORAGE DEVICE

Filed Jan. 11, 1951 2 Sheets-Sheet 2

Applicant:
F. C. Williams
Attorneys:
Moore & Hall

Patented June 16, 1953 2,642,550

UNITED STATES PATENT OFFICE 2,642,550

ELECTRONIC INFORMATION STORAGE DEVICE

Frederic C. Williams, Timperley, England, assignor to National Research Development Corporation, London, England Application January 11, 1951, Serial No. 205,459
In Great Britain January 19, 1950

12 Claims. (Cl. 315—12)

Figure 1:
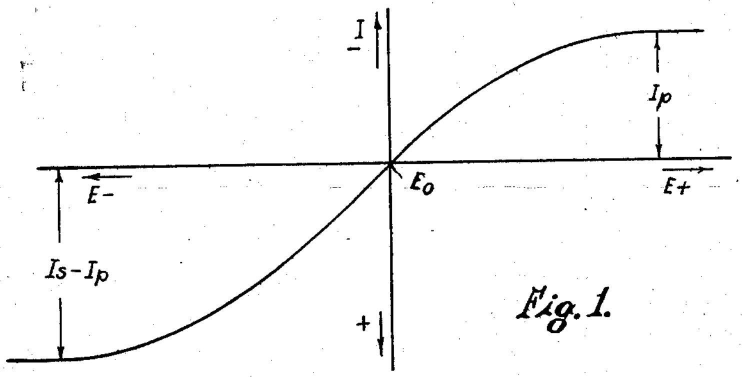

This invention relates to electronic information-storing devices of the type in which digital information of two kinds is recorded as two different conditions of charge produced on an elementary area of an insulating storage surface by a recording electron beam.

It has been previously proposed (for example in U. S. Serial No. 50,136 filed September 20, 1948 and U. S. Serial No. 124,192 filed October 28, 1948) to record digital information as the states of charge of discreet areas on a storage surface, which may be the screen or other suitable target, in a cathode-ray tube, a positive charge which is first established by secondary emission from each discrete area being left unchanged if a digit of one kind is to be recorded but being later reduced by causing further secondary electrons to fall upon the discrete area if a digit of another kind is to be recorded. The process of recording digital information is usually referred to as "writing."

In practical embodiments of the devices for the recording of binary-digital information, the secondary electrons required to perform the "modifying" phase of the writing process for each digit are in general derived from areas on the recording surface which differ from the areas upon which positive charges are first established. In the case of the so-called "dot-dash" mode of operation a positive charge established on a single spot area may be modified by secondary emission from an adjacent elongated spot or "dash" area, while in other modes of operation, for example the socalled "defocus-focus" mode, the area upon which the initial positive charge is laid down and the area from which modifying secondary emission is obtained are different in magnitude, one being contained within the other. It will be apparent that many of these known methods of digital recording and variations of such methods may require some operation, more complex than simple switching on and off, to be performed upon the cathode ray beam during each interval allocated to the writing of a digit. For example the beam may be required to be deflected or caused to scan an area, or the beam spot size may require to be modified. In general, also, in the known methods of digital recording of the kind referred to, only a fraction of the recording area which may be bombarded for the writing of one digit provides a storage effect which is subsequently "read." The nature of a digit which has been recorded is determined or "read" by the first phase of a subsequent writing process which produces a stable positive charge on a corresponding area of the recording surface; if the positive charge previously produced on the area had not been subsequently modified, the first phase of the subsequent writing process does not have to recreate the positive charge, while if the positive charge previously laid down had been subsequently modified, the subsequent writing process has first to recreate the stable level of positive charge, with the production of a characteristic signal in the output from a signal pick-up device associated with the recording surface. The digit-identifying signal which is derived during a "reading" operation is thus derived solely from that portion of the recording surface area allocated to a digit on which a modified charge is produced and this area can, in general, only be a fraction of the total area bombarded from each digit.

It is desirable, from the point of view of the most economical use of a recording surface and the production of a large reading signal, that as large a proportion of the recording surface area which may be bombarded for the writing of each digit should contribute to the reading signal and the total area of recording surface which is allocated to each digit should be as small as possible, consistent with the production of an adequate reading signal. U. S. Serial No. 192,852 filed October 30, 1950, describes a method of digital recording of the kind referred to, in which substantially the entire area bombarded during the writing of a digit contributes to the reading signal. This effect, however, is obtained by utilising a short length of scanned line as the recording area, a stable positive charge being produced by a high speed scan while the secondary emission for the refilling process is provided by a later relatively slow scan along the same line.

It is the object of the present invention to provide an electrostatic digital storage device of the type referred to in which the minimum possible area of recording surface is required to be bombarded for the recording of each digit and in which the charge on the whole of each area allocated to the recording of a digit contributes to the reading of the recorded information.

According to the present invention, in an electronic information-storing device of the type set forth, a digit of one kind is recorded by bombarding the elementary area with a cathode ray beam of suitable velocity to produce one stable state of positive charge on the area by secondary emission from the area and for recording a digit of the other kind means are provided for applying an oscillatory voltage to an electrode capacitively coupled to the storage surface, during bombardment of the area by the cathode ray beam, the oscillatory voltage being adapted to vary the effective secondary emission ratio of the storage surface.

Figure 2:
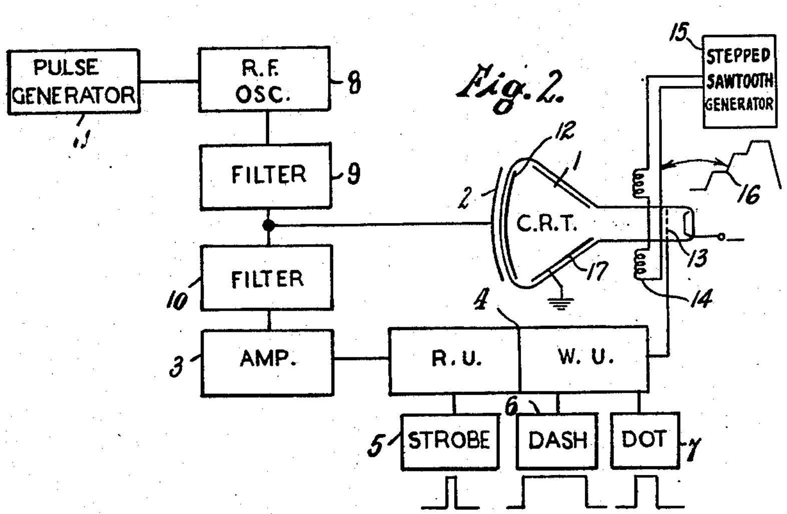
Figure 3:
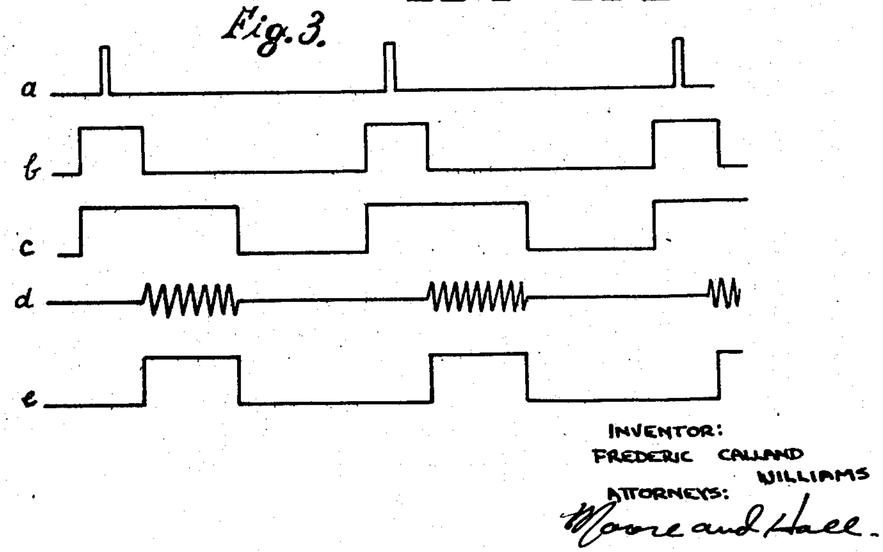
Figure 4:
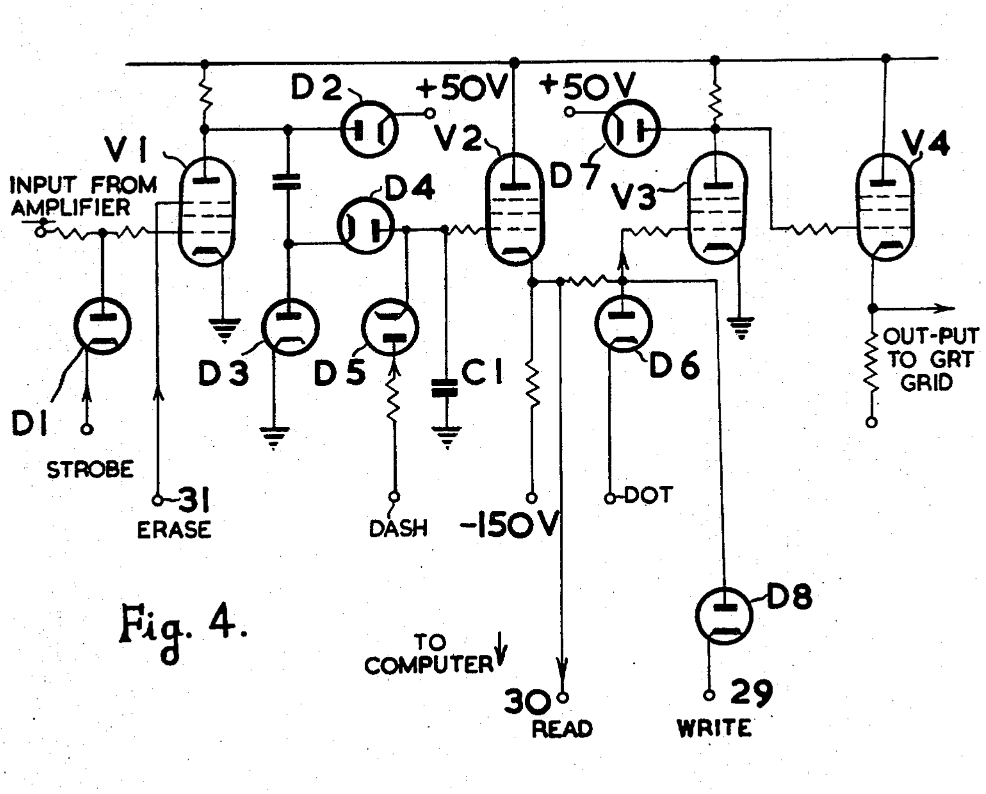

The invention will be described with reference to the accompanying drawing, in which Figure 1 is an explanatory diagram, Figure 2 illustrates in block schematic form an electrostatic storage system which is of the same general type as those described in the patent specifications referred to and which is capable of storing and regenerating digital data, Figure 3 contains explanatory waveform diagrams, and Figure 4 is a circuit diagram of the reading and writing unit of Figure 2;

Figure 1 indicates how the net current I flowing to an area on a secondary emitting surface, which is bombarded with a cathode ray beam of given velocity and intensity, varies with the potential E of the surface of the area. When the net current flowing to the bombarded area is zero, the number of secondary electrons leaving the area equals the number of primary electrons reaching the area in the incident beam and the surface potential will be the equilibrium value $E_0$ which, for a normal secondary emission ratio greater than unity is slightly positive with respect to the potential of the final anode or other electrode that acts as a collector of the secondary emission. This equilibrium potential $E_0$ is chosen as the origin in Figure 1. It will be apparent that if, by some means or other, the surface potential is maintained more positive than $E_0$ the effective secondary emission ratio will be reduced due to secondary electrons falling back to the area and a negative current will flow to the area. The curve relating current and surface potential will be asymptotic as shown to the limiting value $I_p$, the current in the incident beam. If on the other hand the surface potential is maintained negative with respect to the equilibrium potential a positive current will flow to the area as more secondary electrons depart from the area than primary electrons arrive in the incident beam. A limiting value of positive current, $I_s - I_p$, where $I_s$ is the secondary emission current produced by the primary current $I_p$, will be obtained when all secondary electrons are attracted from the area.

The relative magnitude of the positive and negative currents which can flow depend upon the secondary emission ratio $$\frac{I_s}{I_p}$$

of the bombarded surface. Obviously if this ratio is equal to 2, then $I_s - I_p = I_p$ and the maximum positive and negative currents obtainable will be equal.

If now while an area is being so bombarded that its surface potential would adjust itself to the equilibrium value $E_0$ the surface potential is caused to vary in an alternating fashion by an applied E. M. F., the effect may be regarded as the application of a corresponding potential variation about $E_0$ on Figure 1. It will be apparent that the effect of the varying surface potential will be to cause corresponding variations in the current flowing to the bombarded area in a manner determined by the shape of the curve of Figure 1 and the shape of the applied E. M. F. wave. For a large-amplitude sinusoidal (or square wave) variation of the surface potential the resultant net current flow to the area, while the potential variation is applied, will depend only upon the relative values of $I_p$ and $I_s$. If $I_p = I_s - I_p$ then the net current flow will be zero and the mean surface potential will be undisturbed, while if $$\frac{I_s}{I_p}$$

is greater than 2 a net positive current will flow to the area causing the mean surface potential to move positively and if $$\frac{I_s}{I_p}$$

is less than 2 (but greater than 1) a net negative current will flow to the area causing a negative movement of the mean surface potential. It is thus possible to charge an area on a secondary emitting surface to the equilibrium potential by simple bombardment or by bombardment combined with an applied alternation of the surface potential to charge the area to a potential which may be positive or negative with respect to the equilibrium potential in dependence upon the secondary emission ratio. It is obvious that if the applied alternation of the potential of the bombarded surface is of smaller amplitude than is required to cause the limiting negative and positive currents to flow the phenomenon of net mean current flow to the bombarded area will still occur if that portion of the curve of Figure 1 which is encompassed by the potential excursion is unsymmetrical about the origin.

Referring to Figure 2, there is shown a cathode ray tube 1 provided with a pick-up plate 2 associated capacitively with the screen or other target, such as a fluorescent screen 12 which is utilised as the charge storage surface. A final anode 17 acts as a collector of secondary electrons. Signal outputs derived from the pick-up plate are fed through an amplifier 3 to a "gate" circuit 4, which may be identical with the corresponding circuit described with reference to Figure 3 of the specification of U. S. Appln. Serial No. 93,612 filed May 16, 1949, and which comprises a reading unit R. U. and a writing unit W. U. These units are illustrated in Fig. 4. Negative-going dot pulses about a resting level of +5 volts are fed through a diode $D_6$ to the control grid of a valve $V_3$. During the pulses the anode current of this valve is cut off and the anode voltage rises until caught by a diode $D_7$ at +50 volts. The resultant anode voltage is fed to the control grid of a cathode follower valve $V_4$ and the output voltage across the cathode load resistance of this valve is fed to the control grid 13 of the cathode ray tube in Fig. 2.

When a positive pulse is fed from the amplifier 3 of Fig. 2 to the reading unit R. U., this pulse appears on the control grid of a valve $V_1$ in Fig. 4, the valves $V_1$ and $V_2$ operating to extend the dot pulse to a dash pulse. The control grid of valve $V_1$ is biased to −15 volts and positive-going strobe pulses from a resting level of −10 volts are also applied through a diode $D_1$ to the control grid of $V_1$. The anode current of $V_1$ is normally cut off and is switched on only when a positive pulse from the amplifier 3 coincides with a strobe pulse. A negative pulse is then produced at the anode of the valve $V_1$. The voltage at the anode of $V_1$ is fed to the control grid of a cathode follower valve $V_2$ which has its upper control grid voltage limit defined at zero volts by conduction of the diodes $D_4$ and $D_5$, and its lower grid voltage limit defined at −15 volts by conduction of the diode $D_5$. Negative-going dash pulses are also fed to the control grid of the valve $V_2$ through the diode $D_5$ about a resting level of −15 volts. The cathode of valve $V_2$ will thus swing in voltage between the approximate values of +3 and −12 volts which are sufficient to cause full anode current and zero anode current respectively to flow in the valve $V_3$. A condenser $C_1$ prevents the voltage on the control grid of valve $V_2$ from changing unless it is driven. This grid will, therefore, remain at −15 volts for the duration of a dash and will then be driven to zero volts and will remain at this voltage until it receives another negative pulse from the anode of the valve $V_1$. The voltage across the cathode load of the valve $V_2$ is fed to the control grid of the valve $V_3$ which is also being fed with dot pulses through the diode $D_6$. If a negative pulse is produced across the cathode load resistance of valve $V_2$, the grid of valve $V_3$ will be initially driven negative by the dot waveform and will cut off the anode current in $V_3$. The anode current will remain cut off for the duration of a dash and the anode voltage of $V_3$ will have a dash waveform. When no negative pulse is produced across the cathode load resistance of valve $V_2$, a dot pulse will be produced at the anode of valve $V_3$.

A convenient read output is derived from the cathode of the valve $V_2$, that is from a terminal 30. Matter to be written into the store from an external source may be applied at a terminal 29 and through a diode $D_8$. In order to write new information over old information by converting a dash pulse on the grid of the cathode ray tube to a dot pulse, a negative pulse is applied to the erase terminal 31 and thus to the suppressor grid of valve $V_{11}$. This cuts off the anode current in the valve and so breaks the regenerative loop. New information can then be written in by applying an appropriate negative voltage at a terminal 29 through a diode $D_8$.

The reading unit R. U. of Fig. 2 includes the valves $V_1$ and $V_2$ of Fig. 4 and the writing unit W. U. of Fig. 2 includes the valves $V_3$ and $V_4$ of Fig. 4.

Referring again to Fig. 2, the reading unit R. U. is fed with a strobe pulse waveform, Figure 3(*a*), from a generator 5 the pulses recurring at the digit repetition frequency, while the writing unit W. U. is fed with corresponding repetitive "dot" and "dash" waveforms shown in Figures 3(*b*) and (*c*) from generators 6 and 7.

The system described so far is identical with the "dot-dash" system previously referred to, and if suitable deflecting potentials are applied to the tube 1 the system will normally operate to sweep the cathode ray beam over the storage surface and to feed "dot" pulses to the control grid or cathode of 1 to cause a "dot" to be written upon the storage surface for every digit, the dot being represented on the storage surface by a dot area charged positively with respect to $E_0$. If, however, a positive signal is fed, during the dot period, from the reading to the writing portion of the unit 4, or from some external writing source to the writing portion of the unit 3, "dash" waves as indicated in Figure 3(*c*) will be fed to the control grid or cathode of the cathode ray tube, and the effect of the extended illumination during the digit period will be to cause the positive charge of $E_0$ produced during the dot interval to be reduced. As explained in the prior specification last referred to, the signals derived from the output of the amplifier 3 during each "dot" interval are indicative of the previous charge condition on the bombarded area and may be used to regenerate the charge pattern by permitting or inhibiting the extended bright-up of the tube 1. In the practical arrangement a positive transient signal is derived when the cathode ray beam is switched on at an area on which the positive charge has been previously reduced and this transient signal is isolated in the gate circuit 4 by the strobe pulse of Figure 3(*a*) to provide the positive signal required to control the application of the "dash" wave to the cathode ray tube modulator. The convention usually employed is to record the digit "0" as an unmodified positive charge or "dot" and the digit "1" as a reduced positive charge or "dash."

In the arrangement according to the present invention however the beam deflecting system of the tube 1 comprises deflecting means 14 and an oscillation generator 15 of known type generating a stepped saw-tooth waveform a part of which is indicated at 16. This deflecting system is arranged to produce only the deflections necessary to direct the beam to a single spot location for each digit and no movement of the beam occurs during a digit interval from the commencement of a "dot" to the end of a "dash." There is however applied to the signal plate 2, from a radio-frequency oscillator 8, a pulse of oscillation, as indicated in Figure 3(*d*) during the extended portion of every digit period, that is to say, the portion between the end of each dot and the end of each dash. The oscillation is applied through a filter 9 which prevents the normal pick-up plate output signals from reaching the oscillator and a filter 10 is connected between the pick-up plate and amplifier to prevent radio frequency being fed to the amplifier. The amplifier 3 may be arranged not to respond at the radio frequency employed, which may be of the order of 20 mc./s., while the digit repetition frequency is of the order of 100 kc./s. The oscillator 8 is keyed by a pulse source 11 which produces a "dash-minus-dot" wave, Figure 3(*e*). The actual form of the wave of Figure 3(*a*) may be modified as necessary to produce the required radio frequency pulse. The generators 5, 6, 7 and 11 may be locked together in any convenient way, for instance by controlling them with a common pulse waveform.

It will be apparent that the effect of the radio frequency applied to the pick-up plate is to cause a corresponding variation of the potential of the recording surface through the capacity coupling between the surface and the pick-up plate and that, therefore, if the cathode ray beam is turned on by a "dash" wave the potential remaining on the bombarded spot when the beam is turned off will in general differ from $E_0$ the potential established on the spot by turn-on of the beam by a "dot" pulse only.

If the secondary emission ratio of the recording surface under the operating conditions is less than 2, the positive potential of the bombarded spot will be reduced by the writing of a "dash" so that the subsequent turning on of the cathode ray beam during a "dot" interval at the same spot will cause a positive transient signal to be selected by the strobe pulse and if the circuit 4 is identical with the circuit described in the prior specification last referred to, this will cause the "dot" modulating waveform to be extended to the "dash" form so that bombardment is continued during the radio frequency pulse and the state of reduced positive charge will be regenerated. If the secondary emission ratio is greater than 2 the writing of a "dash" will cause the positive potential of the bombarded spot to be increased beyond $E_0$ so that a negative signal will be obtained during the "dot" interval at a subsequent exploration. The circuit of unit 4 will require modification in this case to enable regeneration of recorded data to take place, but the modification need be no more than the provision of a suitable polarity reversing stage before the gate circuit, or the provision of such a stage after the gate circuit together with such modification as may be necessary to the gate circuit itself and possibly the polarity of the "strobe" pulse, to ensure that the gate circuit selects negative instead of positive signals.

It is necessary that the oscillatory voltage applied to the signal plate 2 should be one capable of being excluded (as by the filter 10 in Figure 2) from the circuit 4 as otherwise the oscillating voltage would mask the signals generated on the signal plate which are indicative of the states of charge of the elementary areas.

I claim:

1. An electronic information-storing device comprising a storage surface, means to direct a beam of electrons recurrently upon an elementary area of said surface, means to maintain said beam substantially stationary upon said area, an electrode capacitively coupled to said storage surface, means to generate an oscillatory voltage and means to apply said oscillatory voltage to said electrode to vary the effective secondary emission ratio of said surface.

2. An electronic information-storing device comprising an insulating storage surface, means to direct a beam of electrons recurrently upon an elementary area of said surface, an electrode capacitively coupled to said storage surface, means to generate an oscillatory voltage, means to apply said oscillatory voltage to said electrode to vary the effective secondary emission ratio of said surface and means responsive to the information to be stored to select between two conditions of bombardment of said area, namely bombardment in the presence and in the absence of said oscillatory voltage upon said electrode.

3. An electronic information-storing device comprising an insulating storage surface, means to direct a beam of electrons recurrently towards an elementary area of said surface and to hold said beam substantially stationary for an interval when so directed, an electrode capacitively coupled to said storage surface, means to generate an oscillatory voltage, means to apply said oscillatory voltage to said electrode during a part only of said interval and means to switch said beam on for two alternative times, one including and one excluding said part.

4. An electronic information-storing device comprising an insulating storage surface, means to direct a beam of electrons recurrently towards an elementary area of said surface and to hold said beam substantially stationary for an interval when so directed, an electrode capacitively coupled to said storage surface, means to generate an oscillatory voltage, means to apply said oscillatory voltage to said electrode during a part only of said interval, means to switch said beam on for two alternative times, one including and one excluding said part and means responsive to the information to be recorded to select between said times.

5. An electronic information-storing device comprising a storage surface, means to direct a beam of electrons upon an elementary area of said surface, an electrode capacitively coupled to said storage surface, means to generate an oscillatory voltage, means for applying said oscillatory voltage to said electrode, means for deriving a control voltage from said electrode, and means for applying said control voltage to control the intensity of said beam.

6. An electronic information-storing device comprising a storage surface, means to direct a beam of electrons recurrently upon an elementary area of said surface, an electrode capacitively coupled to said storage surface, means to generate an oscillatory voltage, means to apply said oscillatory voltage to said electrode to vary the effective secondary emission ratio of said surface, means for selecting between two conditions of bombardment of said area, namely bombardment in the presence and in the absence of said oscillatory voltage upon said electrode, and means for applying a voltage generated in said electrode in response to bombardment of said elementary area by said beam to control said selecting means.

7. An electronic information-storing device comprising an insulating storage surface, an electrode capacitively coupled to said storage surface, means to direct a beam of electrons recurrently upon an elementary area of said surface to eject secondary electrons from said area and thus to charge said area and to generate in said electrode a voltage dependent on variation in the charge on said area, means to generate an oscillatory voltage, means to apply said oscillatory voltage to said electrode to vary the effective secondary emission ratio of said surface, means to select between two conditions of bombardment of said area, namely bombardment in the presence and in the absence of said oscillatory voltage upon said electrode and means for applying the first-named voltage to control said selecting means, whereby the charge on said area is regenerated.

8. An electronic information storing device comprising a storage surface, a source of electrons, and means directing electrons from said source to said surface in a beam, deflection means adjacent said beam causing said beam to explore a plurality of discrete areas of said surface, said deflecting means including means causing said beam to halt for a predetermined period during its exploration of each of said areas, a pick-up plate adjacent said storage surface, and a source of oscillatory voltage coupled to said pick-up plate, said source of oscillatory voltage including means causing it to be operative only during a predetermined portion of said halted period.

9. The device of claim 8 including beam intensity control means adjacent said source of electrons, gating means coupling said pick-up plate to said intensity control means, and pulse means coupled to said gating means to cause selective passage of signals to said intensity control means.

10. An information storage device comprising a storage surface, a source of electrons, means directing electrons from said source to said surface in a beam, deflection means causing said beam to scan discrete areas of said surface, beam intensity control means adjacent said electron source, information control means coupled to said intensity control means and causing said beam to be turned on for a first period of time when a first information is to be stored and causing said beam to be turned on for said first period of time and also for a second period of time when a second information is to be stored, a pick-up plate adjacent said storage surface and capacitively coupled thereto, and a source of oscillatory potential coupled to said pick-up plate and operative only during said second period of time.

11. An information storage device comprising a storage member, an electron beam producing means for charging discrete areas of said storage member, beam deflection means for causing said electron beam to scan each of said areas of said storage member, means including a pick-up plate adjacent said storage member for reading information stored on said area, and a source of oscillatory voltage coupled to said pick-up plate and operative during only a portion of the scan of each of said areas.

12. The device of claim 11 including gating means coupling said pick-up plate to said beam producing means to control the charging of said discrete areas in response to the reading of said information.

FREDERIC C. WILLIAMS.

References Cited in the file of this patent

UNITED STATES PATENTS

| Number | Name | Date |
|---|---|---|
| 2,290,581 | Donal Jr. | July 21, 1942 |
| 2,307,188 | Bedford | Jan. 5, 1943 |
| 2,461,515 | Bronwell | Feb. 15, 1949 |
| 2,497,660 | Devine | Feb. 14, 1950 |